May 7, 1946. W. W. ALKIRE 2,399,844
COMBINED BAILER AND DUMP
Filed April 4, 1945 4 Sheets-Sheet 1
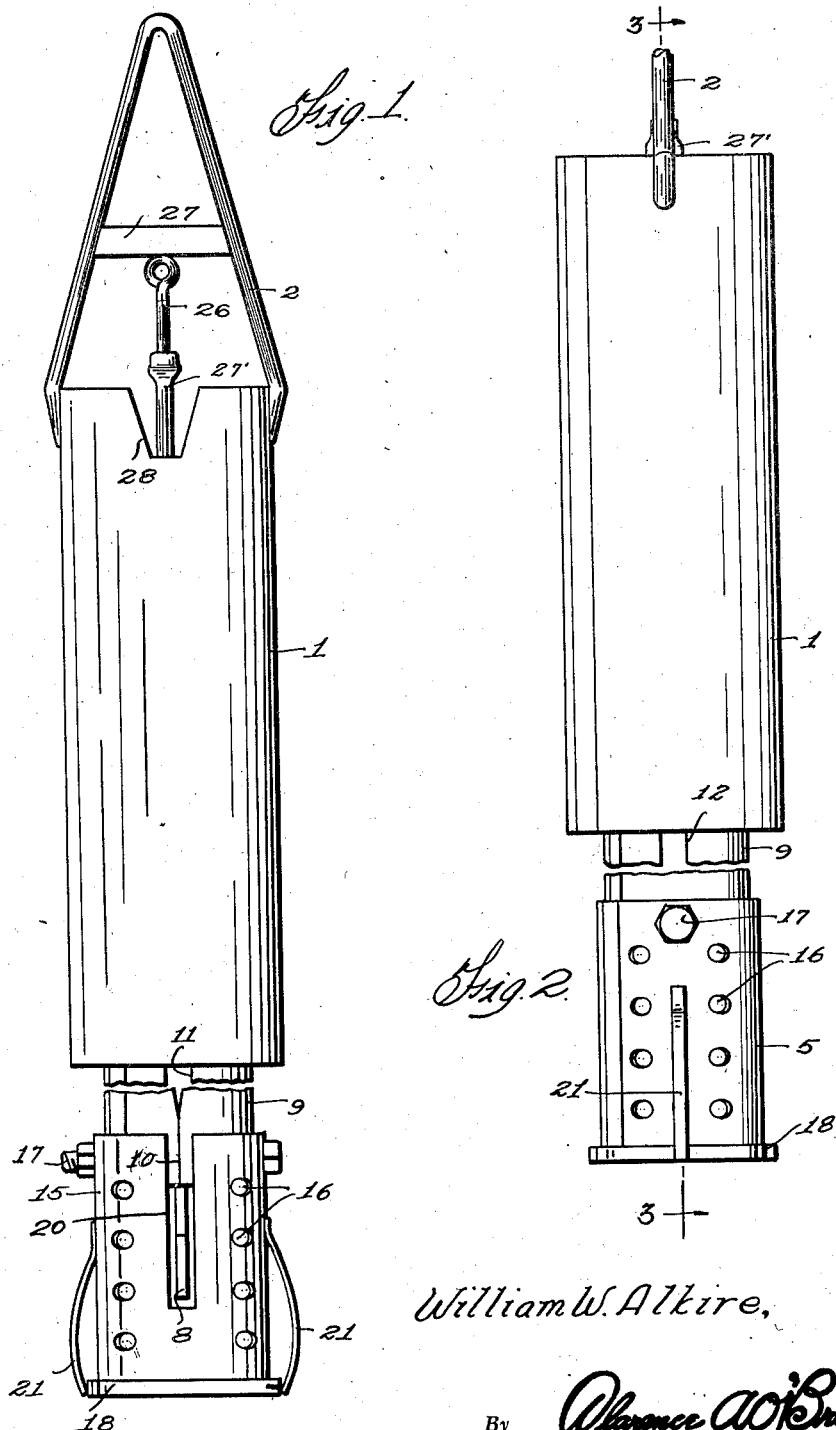
Inventor
William W. Alkire,
By Clarence A. O'Brien
and Harvey B. Jacobson
Attorneys May 7, 1946.  W. W. ALKIRE  2,399,844
COMBINED BAILER AND DUMP
Filed April 4, 1945  4 Sheets-Sheet 2
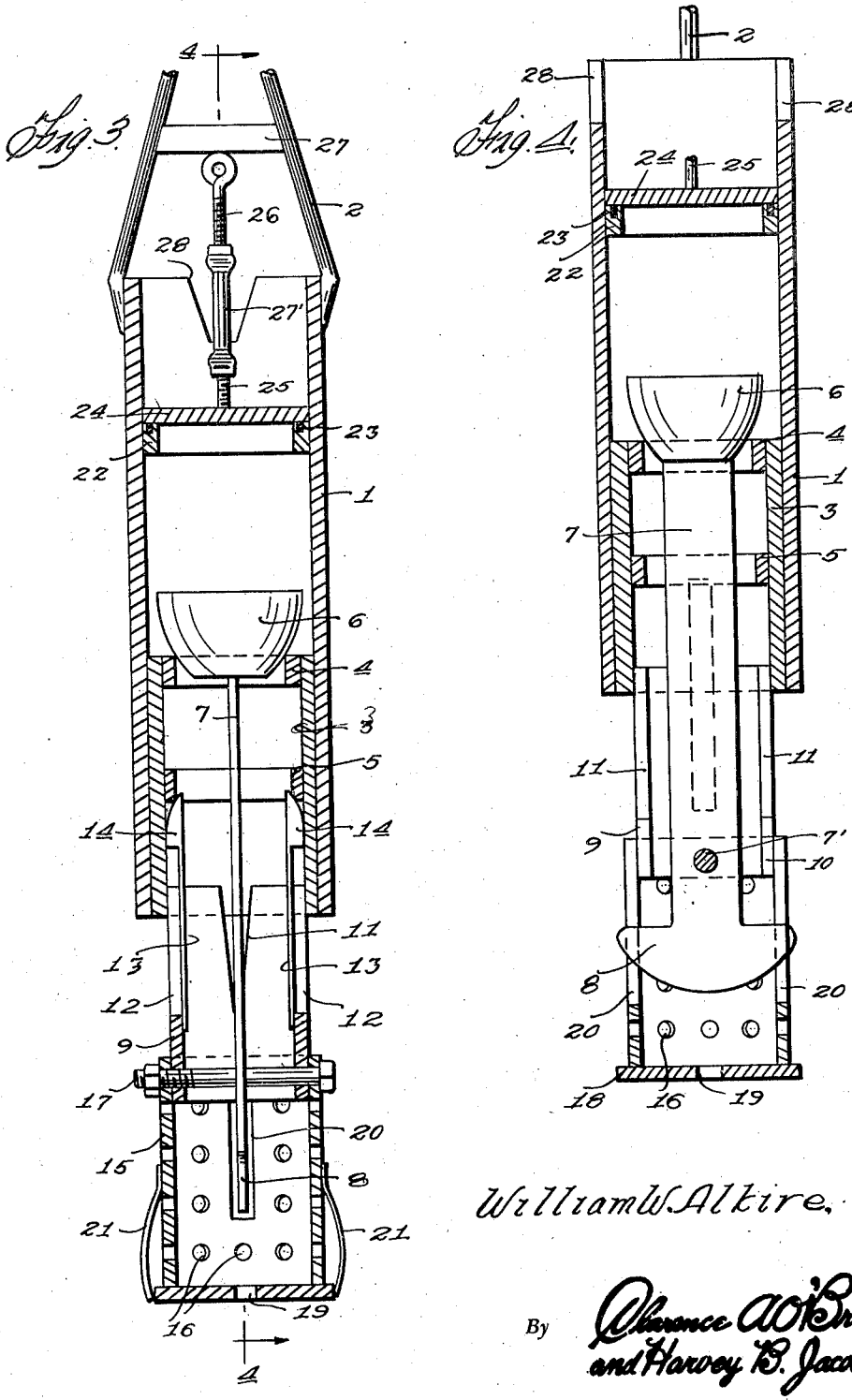
Inventor
*William W. Alkire,*
By *Clarence A. O'Brien
and Harvey B. Jacobson*
Attorneys May 7, 1946.　　　W. W. ALKIRE　　　2,399,844
COMBINED BAILER AND DUMP
Filed April 4, 1945　　　4 Sheets-Sheet 3

Inventor
William W. Alkire,

By Clarence A. O'Brien
and Harvey B. Jacobson
Attorneys

May 7, 1946.    W. W. ALKIRE    2,399,844
COMBINED BAILER AND DUMP
Filed April 4, 1945    4 Sheets-Sheet 4
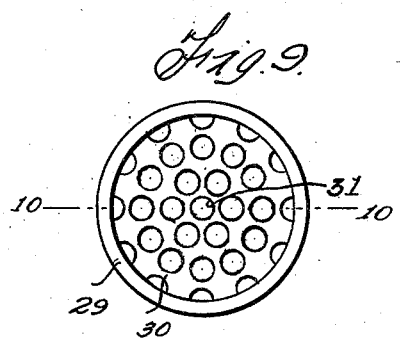
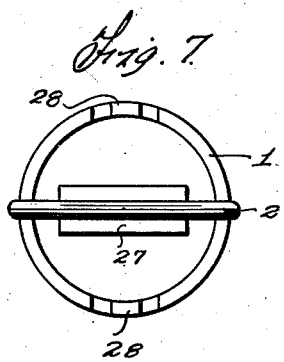
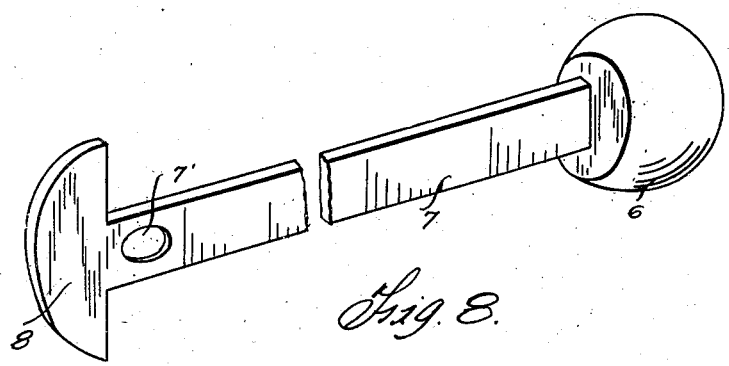
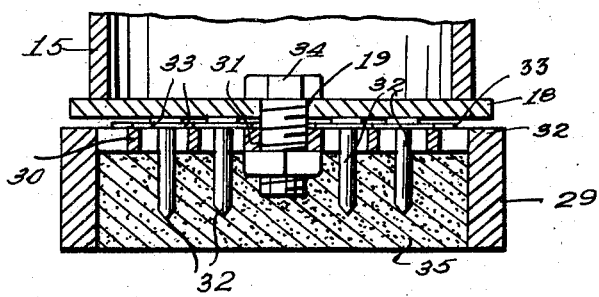
Inventor
William W. Alkire,
By Clarence A. O'Brien
and Harvey B. Jackson
Attorneys Patented May 7, 1946

2,399,844

UNITED STATES PATENT OFFICE 2,399,844

COMBINED BAILER AND DUMP

William W. Alkire, Vancouver, Wash.

Application April 4, 1945, Serial No. 586,612

4 Claims. (Cl. 166—19)

My invention relates to improvements in combined bailers and dumps, of the so-called dart valve type, for use in drilling oil, gas and water wells to bail out mud, muck and other matter from such wells, and/or dump water into the same for drilling.

The primary object of my invention is to equip such bailers and dumps with inexpensive, efficient means whereby the bailer and dump may always be run into a well to bottom and water be dumped by means of the same regardless of cave-ins or like conditions.

Another object is to provide the dart valve type of well bailer and dump with means of the character and for the purpose above set forth, and whereby cement may be applied to the side of the well to wall up the same as occasion may require.

Still another object is to provide for equipping such bailers and dumps with improved means for locating lost tools or the like in the bottom of the well, preparatory to fishing for the same.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation, partly broken away, illustrating my improved bailer and dump in a preferred embodiment thereof.

Figure 5:
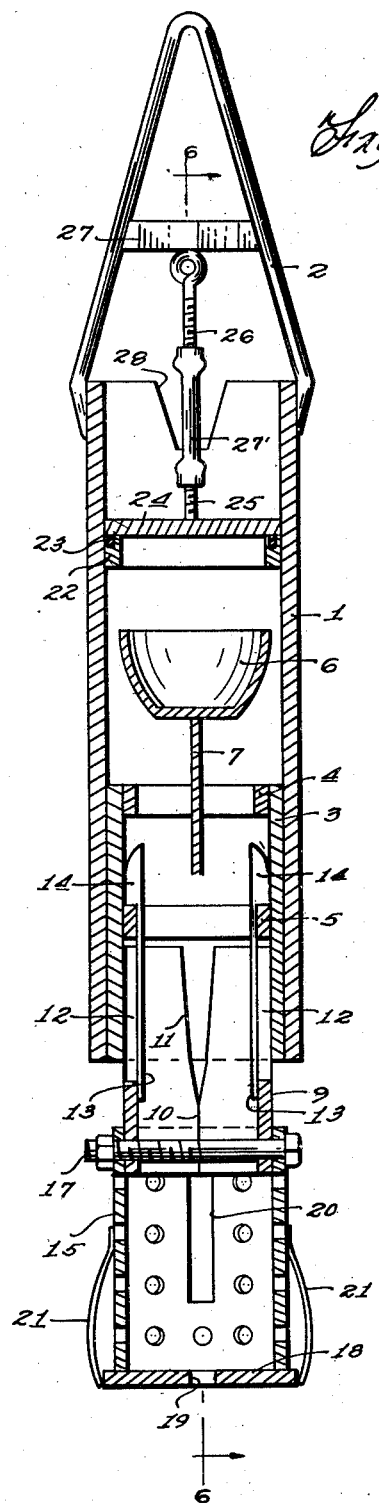
Figure 6:
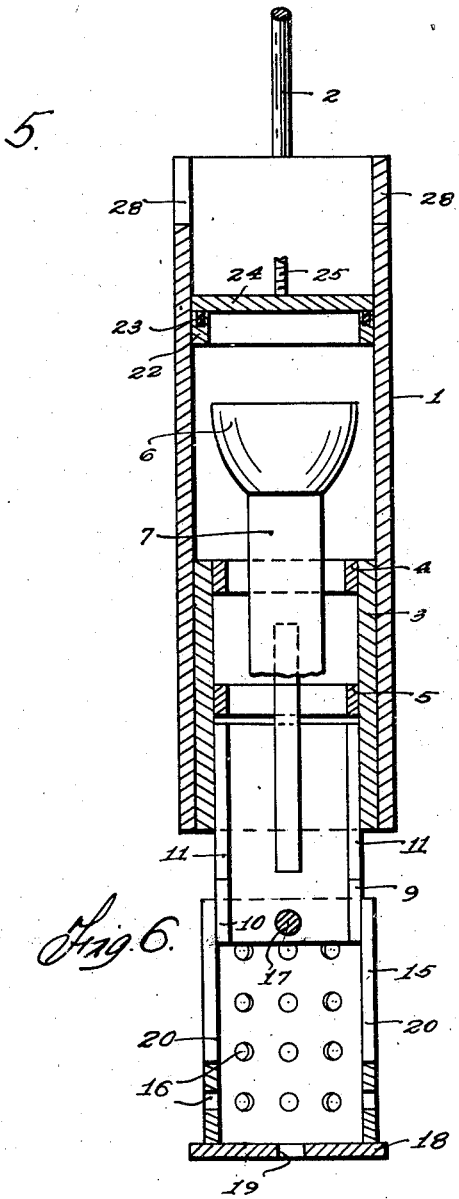

Figure 2 is a similar view with the bailer and dump rotated through an angle of 90°, Figure 3 is a view in longitudinal section taken on the line 3—3 of Figure 2, Figure 4 is a similar view taken on the line 4—4 of Figure 3, Figure 5 is a view similar to Figure 3 illustrating the parts in valve-opening position, Figure 6 is a view in longitudinal section taken on the line 6—6 of Figure 5, Figure 7 is a view in end elevation looking at the upper end of the bailer and dump, Figure 8 is a view in perspective of the dart valve detached, Figure 9 is a view in bottom plan of the locater shell, Figure 10 is a view in transverse section taken on the line 10—10 of Figure 9, and illustrating the locater shell loaded for use.

Referring to the drawings by numerals, my invention has been shown therein as applied to the tube, or barrel, 1 of a bailer and dump such as is usually equipped with a dart type valve and provided at the upper end thereof with an operating bail 2.

According to my invention, the tube, or barrel, 1 is provided in the lower end thereof with a short bushing 3 suitably fixed in said end, said bushing having in the upper end thereof an annular valve seat 4 and being provided intermediate its ends with an internal keeper ring 5 fixed therein in any suitable manner, as by welding, not shown. The valve seat 4 is designed to seat therein the cup-shaped upper end 6 of the usual dart valve, the shank 7 of which depends below the tube 1 and is equipped at its lower end with the flat dart blade 8.

Slidably fitted upwardly in the bottom of the bushing 3 is a tubular section 9 longitudinally split in halves, as at 10, with the split flaring upwardly for a short distance from the bottom of the section to provide outlet openings 11, said section being provided with a pair of diametrically opposite slots 12 therein extending longitudinally downwardly from the upper end of the section for a short distance and which also form outlet openings in the section. A pair of spring arms 13 extend out of the upper end of the section 9 opposite the slots 12 with lower ends suitably attached, as by welding not shown, in said section, said arms being provided with upper end dogs 14 designed to slide upwardly through the keeper ring 5 and to snap over said ring.

A second tubular section 15 perforated, as at 16, is fitted at its upper end over the lower end of the section 9 and secured thereto by means of a bolt 17 extending diametrically through the same and said section 9. The second section is provided with a closed bottom 18 except for an axial bolt hole 19 therein for a purpose presently seen. A pair of diametrically opposite slots 20 extend into the second section from the upper end thereof in a plane at a right angle to the axis of the bolt 17 for a purpose presently apparent.

The described sections 9 and 15 are designed to be suspended from the valve seat 4 by the dart valve upper end 6, when the latter is seated, with the shank 7 of said valve extending through the section 9 into the section 15 and the dart blade 8 extending through the slots 20. For this purpose, the shank 7 of the dart valve is provided upwardly of said blade 8 with a suitable bolt-accommodating aperture 7' through which the bolt 17 is extended.

Referring now to the use and operation of the invention, as so far described. When the upper end 6 of the dart valve is seated, the sections 9, 15 are suspended in an extended position relative to the tube 1, or bushing 3, with the dogs 14 disposed below the keeper ring 5, as shown, for instance, in Figure 3. With the parts in this position, the tube 1 may be filled with water from the top thereof and lowered into a well until the bottom 18 of the second section 15 strikes the bottom of the well, not shown. Upon further lowering of the tube 1 into the well, said tube 1 is moved downwardly relative to the section 9 and the dogs 14 are caused to wipe through the keeper ring 5 and snap over the same, as shown in Figure 5, thereby locking the section 9, and section 15, in a retracted position relative to the tube 1. During this movement of the tube 1 relative to the section 9 and the section 15, since the shank 7 of the dart valve is anchored to the bolt 17, said dart valve is moved upwardly into opening position, as shown also in Figure 5. Thus, the tube 1 is opened to discharge water out of the sections 9, 15 through the split 11 and slots 12 of section 9 and through the apertures 16 and the slots 20 of the section 15. In cementing operations, the procedure and use is the same as described for discharging water.

At this point, it is explained that the sections 9 and 15 are designed as an attachment for the tube 1 to be attached, as occasion may require, and to disengage the dogs 14 from the keeper ring 5, when said sections 9, 15 are to be detached. This may be accomplished by withdrawing the bolt 17, detaching the section 15 from the section 9 and then rocking the halves of the section 9 upon each other to close the flared portion of the split 10 so as to move the dogs 14 inwardly of the keeper ring 5 and disengage the same from said ring, after which said halves of the section 9 may be withdrawn out of the bushing 3. As will be seen, when the sections 9, 15 are detached, the dart valve is operated in the usual manner under lowering of the tube 1 into a well for the usual bailing operations. To prevent the sections 9, 15 from tending to bind in the lowering operation, that is, the section 9 in the bushing, longitudinally extending bowed fender fingers 21 are provided on the section 15 for engagement with the sides of a well to facilitate maintaining the sections 9, 15 aligned with the bushing 3.

In addition to the foregoing, my invention comprehends a closure for the upper end of the tube 1 for preventing water, or cement, from being blown out of said tube in a lowering operation by gas accumulated in the well. The closure comprises an annular seat 22 suitably secured in the upper end of said tube 1 and having countersunk therein a suitable annular gasket 23 designed to form a seal for a disc-like closure plate 24 fitting in the tube 1 against said seat 22 and gasket 23. The closure plate 24 is provided with an axial stem including aligned, oppositely threaded sections 25, 26 connected by a turnbuckle 27, the section 26 being adapted to be thrust upwardly against a cross bar 27' on the bail 2 under turning of the turnbuckle 27, whereby the closure plate 24 may be tightened against the seat 22 and gasket 23. Upper edge notches 28 are provided in the tube 1 for ready access to the turnbuckle 27. It will be understood that the closure plate 24 is removed under ordinary conditions and while the tube is being filled with either water or cement.

As shown in Figures 9 and 10, a locater attachment is provided for the section 15 for locating lost tools or the like in the bottom of a well and which comprises a cup-like annular locater shell 29 having a perforated top 30 provided with an axial bolt hole 31 therein. Spikes 32 are inserted through the perforations in the top 30 into the shell 29 with stop members 33 under the heads of the spikes and the shell is then clamped to the bottom 18 of the shell 15 by means of a bolt 34 inserted through the aperture 31 and the aperture 19. The shell is then loaded with packed soap, or the like, 35 to provide an impression surface, whereby when the tube 1, with the sections 9, 15 attached, is lowered into a well, an impression of a tool or tools in the bottom of the well may be made in the soap 35 and a lost tool or tools thus located with respect to the sides or center of the well for fishing out the same.

The foregoing will, it is believed, suffice to impart a clear understanding of my invention without further explanation, together with the manifold advantages thereof.

Manifestly, the invention, as described, is susceptible of modification as regards structure and combination of parts, without departing from the inventive concept, and right is herein reserved to such modifications as fall within the scope of the appended claims.

What I claim is:

1. In apparatus of the class described, the combination with a tube adapted to be lowered into a well, and a downwardly seating valve in the lower end thereof having a stem depending out of the bottom of the tube and terminating in a dart blade end, of means for moving said stem upwardly when the tube reaches the bottom of the well to dump water out of the tube loaded therein above said valve comprising a tubular perforated section with a closed bottom enclosing said blade end and suspended therefrom for engaging the bottom of the well to hold said valve stationary while the tube is being lowered relative thereto, and means slidably connecting said section to said tube, and means to lock said section to said tube with a snap action when said tube has been lowered relative to said valve sufficiently to fully open the same.

2. In apparatus of the class described, the combination with a tube adapted to be lowered into a well, and a downwardly seating valve in the lower end thereof having a stem depending out of the bottom of the tube and terminating in a dart blade end, of means for moving said stem upwardly when the tube reaches the bottom of the well to dump water out of the tube loaded therein above said valve comprising a tubular perforated section with a closed bottom enclosing said blade end and suspended therefrom for engaging the bottom of the well to hold said valve stationary while the tube is being lowered relative thereto, and means slidably connecting said section to said tube, and means to lock said section to said tube with a snap action when said tube has been lowered relative to said valve sufficiently to fully open the same comprising a pair of dogs, and a seat for said valve with which said dogs interlock against downward movement relative thereto.

3. In apparatus of the class described, the combination with a tube adapted to be lowered into a well, and a downwardly seating valve in the lower end thereof having a stem depending out of the bottom of the tube and terminating in a dart blade end, of means for moving said stem upwardly when the tube reaches the bottom of the well to dump water out of the tube loaded therein above said valve comprising a tubular perforated section with a closed bottom enclosing said blade end and suspended therefrom for engaging the bottom of the well to hold said valve stationary while the tube is being lowered relative thereto, and means slidably connecting said section to said tube, and means to lock said section to said tube with a snap action when said tube has been lowered relative to said valve sufficiently to fully open the same, comprising a pair of dogs, and a seat for said valve with which said dogs interlock against downward movement relative thereto, the first-mentioned means comprising a tubular member detachably attached to the perforated section and extending into the bottom of the tube, said member being longitudinally split into half-sections having rocking engagement when detached from the perforated section, said dogs being fixed to said half-sections for rocking therewith to break the interlock between the same and said seat.

4. In apparatus of the class described, the combination with a tube adapted to be lowered into a well, and a downwardly seating valve in the lower end thereof having a stem depending out of the bottom of the tube and terminating in a dart blade end, of means for moving said stem upwardly when the tube reaches the bottom of the well to dump water out of the tube loaded therein above said valve comprising a tubular perforated section with a closed bottom enclosing said blade end and suspended therefrom for engaging the bottom of the well to hold said valve stationary while the tube is being lowered relative thereto, means slidably connecting said section to said tube, and means on the bottom of said perforated section for obtaining an impression of lost articles in the bottom of the well.

WILLIAM W. ALKIRE.